United States Patent Office 3,384,621
Patented May 21, 1968

3,384,621
METHOD FOR PREPARING POLYOXY-
METHYLENE OF IMPROVED THERMAL
STABILITY
Shigeki Horiie, Eiji Sakaoka, Susumu Kurematsu, and Michikazu Hiraoka, Tokyo, Japan, assignors to Denki Kagaku Kogyo Kabushiki Kaisha, Tokyo, Japan, a corporation of Japan
No Drawing. Filed Feb. 8, 1965, Ser. No. 431,187
Claims priority, application Japan, Feb. 11, 1964, 39/6,881
8 Claims. (Cl. 260—67)

ABSTRACT OF THE DISCLOSURE

Method for preparation of substantially pure white polyoxymethylene of good thermal stability comprising incorporating polymerized or copolymerized polyoxymethylene of high molecular weight and from 0.1 to 20% ammonium cyanate in an organic solvent and heating.

This invention relates to the preparation of novel polyoxymethylene having a high degree of thermal stability.

Polyoxymethylene usually prepared by polymerizing formaldehyde or its trimer, viz. trioxane, has not sufficient thermal stability during molding or processing at elevated temperatures even when it is polymerized to have large molecular weight. As methods for preparing polyoxymethylene having excellent thermal stability at elevated temperatures, the following methods, for example, have been proposed.

(1) A stabilizing method wherein both terminal hydroxyl radicals of high molecular weight polyoxymethylene are etherified.

(2) The same method as 1 wherein the terminal hydroxyl radicals are esterified.

(3) Same method as 1 wherein the terminal hydroxyl radicals are urethanated by using aliphatic or aromatic isocyanate.

(4) Same method as 1 wherein the same molecules are blocked by using unsaturated compounds.

By these methods it is able to improve the thermal stability of polyoxymethylene. Namely, the value of $K_{222}$, which is the reaction rate constant for thermal degradation at 222° C., would be reduced from 3 through 6% per minute to less than 1% per minute. But on the other hand, polyoxymethylene that has been thermally stabilized by these prior arts is often colored thereby deteriorating the quality of the product.

An object of this invention is to provide polyoxymethylene having improved thermal stability or having the value of $K_{222}$ less than 0.5% per minute.

Another object of this invention is to provide colorless or pure white polyoxymethylene having improved thermal stability.

In accordance with this invention, the above objects are accomplished by the reaction of ammonium cyanate with polyoxymethylene in the presence of organic solvent or in the molten state without using solvent. When the polyoxymethylene, prepared by polymerizing formaldehyde or trioxane in the presence of a catalyst in accordance with the usual methods, is reacted with ammonium cyanate according to the principle of this invention, a pure white product having low value of $K_{222}$ of less than 0.5% per minute. In addition to the polymerized polyoxymethylene, this invention can equally be applied to the polyoxymethylene prepared by copolymerizing trioxane and other cyclic ethers.

According to one embodiment of this invention, powders of polyoxymethylene are dissolved in any suitable organic solvent of about two to six times, by weight, which solvent is chemically inert to the polyoxymethylene and ammonium cyanate, and 1 to 20%, based on the weight of the polymer, of ammonium cyanate is also dissolved in the solvent, and then the solution thus formed is heated to a suitable temperature in a range from 50 to 180° C. for several minutes or several hours to cause the reaction between the polyoxymethylene and ammonium cyanate. It is preferable to replace the air in the reaction vessel by an inert gas to prevent the degradation of polyoxymethylene. After cooling the reaction product, the precipitated polymer is separated by filtration, rinsed by acetone and water, and is finally dried in vacuum to obtain the product. It is to be understood that the temperature and time of reaction are not critical, and that the above described data are only the preferred ones. The amount of ammonium cyanate incorporated is not critical, but the above described range is preferred. In certain cases ammonium cyanate of less than 1% is still effective. Among the inert organic solvents may be mentioned, for example, aliphatic or aromatic hydrocarbons, derivatives thereof, organic bases containing nitrogen like dimethylformamide, cyclic esters like γ-butyrolactone, aromatic nitrocompounds like nitrobenzene or mixtures of them.

According to another embodiment of this invention, mixed powders of polyoxymethylene and ammonium cyanate are heated and melted in an inert gas atmosphere at temperatures above the melting point of polyoxymethylene, preferably within a range of from 170 to 190° C., and the molten mixtures are kneaded for several minutes or several hours to cause the reaction between the polyoxymethylene and ammonium cyanate. After cooling, the solidified substance is pulverized to obtain the product. While the amount of ammonium cyanate incorporated is like the preceding modification, there is no loss of ammonium cyanate caused by dissolving in the solvent in this modification, so that the amount of ammonium cyanate incorporated can be advantageously reduced to from 0.05 to 5.0%, based on the weight of the polymer.

While the mechanism of chemical reaction of this invention is not yet clearly analyzed, it is believed that the thermal stability of the polymer is also increased by any blocking reaction between ammonium cyanate and terminal hydroxyl radicals of high molecular weight polyoxymethylene. The fact that, due to this reaction, the polymer is perfectly free from color is a novel feature of this invention which was revealed by our exhaustive research.

Although ammonium cyanate shows substantial instability when the temperature is elevated up to about 100° C., thus causing decomposition, it is fairly stable in an organic solvent. However at a higher temperature of the order of 170° C., it appears that it undergoes decomposition to some extent even in the organic solvent. Further it is presumed that the decomposition product may react with the polyoxymethylene, although exact mechanisms of decomposition and reaction are not yet cleared.

Although there is no limitation in the value of intrinsic viscosity ($\eta$) of the polyoxymethylene used in this invention, which is obtained by measurement carried out in p-chlorophenol solution containing 2% of α-pinene and maintained at 60° C., it is preferable to use the polymer whose ($\eta$) is larger than 1.0. It was found that the intrinsic viscosity of the polymer stabilized by the process of this invention was substantially the same as that of the polymer before stabilization.

As is well recognized, the value of $K_{222}$ can be determined by heating a sample in methyl salicylate vapor (B.P. 222° C.) and maintained at this temperature, and by measuring the percentage of weight loss caused by the thermal degradation as the function of time. Generally, the value of $K_{222}$ of a highly polymerized polyoxymethylene not yet treated is of the order of from 3% to 6% per minute, but the same polyoxymethylene subjected to the stabilizing treatment of this invention exhibits a value of $K_{222}$ of less than 0.5% per minute, or in some cases of less than 0.1% per minute. This means that the thermal stability of the treated polyoxymethylene has been greatly improved thus affording satisfactory thermal stability to the polymer when it is molded or processed.

The following examples are given by way of illustration, and are not to be construed as limiting in any way the scope and spirit of the invention. All parts are by weight.

EXAMPLE 1

One hundred parts of powdery polyoxymethylene prepared by the usual catalytic polymerization ($K_{222}$=3.50% per minute, $[\eta]$=1.56), 500 parts of mixed solvent consisting of 90%, by weight, of γ-butyrolactone and 10%, by weight, of dimethylformamide, and 5 parts of ammonium cyanate were put in a round flask, of which atmosphere had been replaced by nitrogen, and which is provided with a reflux condenser and a stirrer, and the mixture was caused to react for 30 minutes while the flask was placed in a thermostat maintained at 170° C. and while the mixture was stirred. At this temperature a homogeneous reaction was taking place because polyoxymethylene and ammonium cyanate were completely dissolved in the solvent.

When the flask was cooled to the room temperature after the reaction, almost all of the polymer was deposited as precipitate, but excess ammonium cyanate and the decomposition product thereof was not deposited so that the precipitated polymer was separated by filtration, and after rinsing several times with acetone and water the precipitated polymer was dried in vacuum at about 60° C. to obtain 90 parts of powders of pure white polyoxymethylene. The value of $K_{222}$ of the polymer obtained was 0.28% per minute and the value of ($\eta$) was 1.55.

EXAMPLE 2

A mixture consisting of 100 parts of polyoxymethylene of which $K_{222}$ was 3.2% per minute and ($\eta$) was 1.82, 400 parts of γ-butyrolactone and 10 parts of ammonium cyanate was put together in a flask identical to that of Example 1, and heated to 170° C. to dissolve the whole content and stirred at this temperature for 30 minutes to effect reaction. Thereafter the reaction product was treated in the same manner as in Example 1, to obtain 95 parts of pure white powders of polyoxymethylene. The value of $K_{222}$ of the polymer obtained was 0.09% per minute and the value of ($\eta$) was 1.85.

EXAMPLE 3

One hundred parts of polyoxymethylene of which $K_{222}$ was 3.07% per minute and ($\eta$) was 1.23 was mixed with 400 parts of nitrobenzene and 2 parts of ammonium cyanate, and the mixture was put in a flask identical to that of Example 1, and then the content was heated to 150° C. to dissolve the whole ingredients. The mixture was stirred at this temperature for 60 minutes to effect reaction. Thereafter the reaction product was treated in the same manner as in Example 1 to obtain 98 parts of pure powders of polyoxymethylene. The value of $K_{222}$ of the polymer obtained was 0.35% per minute and the value of ($\eta$) was 1.25.

EXAMPLE 4

One hundred parts of polyoxymethylene containing 1.9%, by weight, of ethylene oxide which is obtained by the copolymerization of trioxane and ethylene oxide, of which $K_{222}$ was 1.71% per minute and ($\eta$) was 1.32, was mixed with 400 parts of γ-butyrolactone and 2 parts of ammonium cyanate, and the mixture was put in a flask identical to that of Example 1, and then the content was heated to 160° C. to dissolve the whole ingredients. The mixture was stirred at this temperature for 40 minutes to cause reaction. Thereafter the reaction product was treated in the same manner as in Example 1 to obtain 97 parts of pure white powder of polyoxymethylene. The value of $K_{222}$ of the polymer obtained was 0.06% per minute and the value of ($\eta$) was 1.33.

EXAMPLE 5

As the reaction vessel was utilized a closed type kneader made of stainless steel, and provided with an inlet and an outlet for nitrogen gas, feeding port for the raw material and a heating jacket, the capacity of the kneader being 0.5 liter. At first nitrogen gas was introduced into the kneader to completely replace the air in it by nitrogen. Then the temperature in the kneader was maintained within a range of from 180 to 190° C. under the atmosphere of nitrogen, and thereafter 100 parts of polyoxymethylene powders prepared from trioxane by catalytic polymerization, its value of $K_{222}$ being 2.6% per minute, and that of ($\eta$) being 1.46, and one part of ammonium cyanate were put into the kneader. After complete melting the content was kneaded for 30 minutes at this temperature to cause reaction. Then the reaction product was taken out of the kneader, cooled and solidified. This solid mass was pulverized in a plastics grinder to obtain 98 parts of pure white powders of polyoxymethylene. The value of $K_{222}$ of the polymer obtained was 0.45% per minute and the value of ($\eta$) was 1.45.

For comparison, when only the polyoxymethylene powder without incorporated with ammonium cyanate was put in the kneader and treated under the same condition, the value of $K_{222}$ of the polymer obtained was 3.82% per minute and the value of ($\eta$) was 1.32.

EXAMPLE 6

The same kneader as in the preceding example was used. One hundred parts of polyoxymethylene powder, of which $K_{222}$ was 2.60% per minute and ($\eta$) was 1.46 and 0.2 part of ammonium cyanate were put in the kneader. After complete melting, the content was kneaded in an atmosphere of nitrogen for 60 minutes at a temperature of from 170 to 180° C. to cause reaction. And then the content was treated in the same manner as in the foregoing example to obtain 99 parts of pure white powders of polyoxymethylene having a value of $K_{222}$ equal to 0.43% per minute and a value of ($\eta$) equal to 1.42.

What is claimed is:

1. In a method for preparing polyoxymethylene the improvement therein for producing substantially pure white powder of polyoxymethylene of improved thermal stability by incorporating polymerized or copolymerized polyoxymethylene of high molecular weight and based on the weight of said polyoxymethylene, of from about 0.1% to about 20% of ammonium cyanate into an inert organic solvent, heating the mixture to dissolve said polyoxymethylene and said ammonium cyanate in said solvent, thereby causing the reaction of ammonium cyanate with said polyoxymethylene.

2. The method of claim 1 in which the amount of organic solvent is from 2 to 6 times based on the weight of said polyoxymethylene.

3. The method of claim 1 in which the organic solvent is selected from the group consisting of γ-butyrolactone, dimethylformamide, nitrobenzene and any mixture of them.

4. The method of claim 1 in which the reaction temperature is from 50 to 180° C.

5. The method of claim 1 in which after the reaction the precipitated polyoxymethylene is recovered from the solvent by filtration, and after rinsing, said polyoxymethylene is dried in vacuum.

6. A method for preparing polyoxymethylene of improved thermal stability by incorporating polymerized or copolymerized polyoxymethylene of high molecular weight in from 0.05 to 5%, based on the weight of said polyoxymethylene of ammonium cyanate, melting said mixture, thereby causing the reaction of ammonium cyanate with said polyoxymethylene.

7. The method of claim 6 in which the reaction is carried out in an inert gas atmosphere, and the reaction temperature is from 170 to 190° C.

8. The method of claim 6 in which after reaction the solidified polyoxymethylene is directly pulverized.

References Cited

UNITED STATES PATENTS 2,893,972  7/1959  Kubico et al. _____ 260—67
3,225,005  12/1965  Asmus et al. _____ 260—67

WILLIAM H. SHORT, *Primary Examiner.*

L. M. PHYNES, *Assistant Examiner.*